US007009598B1

(12) United States Patent
Bohn

(10) Patent No.: US 7,009,598 B1
(45) Date of Patent: *Mar. 7, 2006

(54) MULTIPLE CHANNEL LIGHT GUIDE FOR OPTICALLY TRACKING POINTING AND INPUT DEVICES

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 198 days.

This patent is subject to a terminal disclaimer.

(21) Appl. No.: 10/382,867

(22) Filed: Mar. 7, 2003

(51) Int. Cl.
*G09G 5/08* (2006.01)

(52) U.S. Cl. ........................ 345/166; 345/175; 250/221

(58) Field of Classification Search ................ 345/161, 345/163–167; 250/221, 221.1
See application file for complete search history.

(56) References Cited

U.S. PATENT DOCUMENTS 5,517,211 A 5/1996 Kwang-Chien
5,578,813 A 11/1996 Allen et al.
5,686,720 A 11/1997 Tullis
5,943,233 A * 8/1999 Ebina et al. .................. 700/85
6,256,016 B1 * 7/2001 Piot et al. .................... 345/166
6,421,045 B1 7/2002 Venkat et al.
6,424,407 B1 * 7/2002 Kinrot et al. ................. 356/28
6,462,330 B1 10/2002 Venkat et al.
6,486,873 B1 11/2002 McDonough et al.
2003/0006965 A1 1/2003 Bohn
2003/0142075 A1 7/2003 Chin
2003/0142078 A1 7/2003 Chin
2003/0201951 A1 10/2003 Chin
2004/0084610 A1 5/2004 Leong et al.
2004/0149894 A1 8/2004 Tschirren et al.

FOREIGN PATENT DOCUMENTS

JP 08137613 A 5/1996
KR 2002050803 A 6/2002

* cited by examiner

*Primary Examiner*—Amr A. Awad
*Assistant Examiner*—Leonid Shapiro
(74) *Attorney, Agent, or Firm*—Banner & Witcoff, Ltd.

(57) ABSTRACT

A light guide includes at least two channels from which light is shined on a target area. The multiple channels disperse light across the target area more uniformly and with fewer dead or bright spots. The channels may be integral to one another, and may be molded. The light guide may further include an integral holder for supporting and aligning a LED light source to shine upon an entrance surface of the light guide. The entrance surface may also be formed as a collection lens. The channels may also be configured to direct light onto a target area at different angles. One or more of the channel faces from which light emanates may also be non-planar.

34 Claims, 13 Drawing Sheets

MULTIPLE CHANNEL LIGHT GUIDE FOR OPTICALLY TRACKING POINTING AND INPUT DEVICES

FIELD OF THE INVENTION

This invention relates generally to optical components usable in optically-tracking pointing and input devices such as computer mice. More particularly, this invention provides a divided light guide for illuminating a target area.

BACKGROUND OF THE INVENTION

Computer input and other pointing devices, such as electronic mice, convert physical movement into movement of a cursor or other image across a computer screen. Previously, many such devices utilized mechanically driven encoder wheels and other moving components to detect direction and magnitude of motion, and to then convert that information into data for communication to a computer or other device. Optical surface tracking offers an improved method of motion detection. Instead of encoder wheels rotated by a ball rolling across a surface, an array of photo-sensitive elements generates an image of a desktop (or other supporting surface) portion when light from an associated illumination source (such as a light emitting diode) reflects from the desktop or other surface. Subsequent images are compared, and based on the correlation between images, the magnitude and direction of mouse motion may be determined. Exemplary optical tracking systems, and associated signal processing techniques, include those disclosed in commonly owned U.S. Pat. Nos. 6,172,354, 6,303,924 and 6,373,047.

FIG. 1A schematically shows various components of an existing optical tracking system in a computer mouse 1*a*. Mouse 1*a* (shown in phantom lines) moves across a surface 2*a* such as a desk top or a table. A region 3*a* of the bottom surface of mouse 1*a* is either transparent or open so that light may reach a portion of the surface 2*a* (the "target area" T) and be reflected back to an image sensor 7*a*. A light source 4*a* inside of mouse 1*a*, which is typically a LED, is selectively turned on and off so as to controllably illuminate the target area T. Light from LED 4*a* reflects from the target area and is collected and focused by a lens 5*a* through an aperture 6*a*. Light passing through aperture 6*a* strikes a photo-sensing surface of an image sensor 7*a*. Image sensor 7*a* then forms (sometimes in connection with other components) an image of the target area T (or a portion thereof). Typically, image sensor 7*a* is attached to a Printed Circuit Board (PCB) 8*a*, only a portion of which is represented in FIG. 1A.

Although an improvement over mechanically-tracking types of motion sensing systems, optically-tracking systems present a new set of challenges. The light source, lens, image sensor and other components must be properly positioned with respect to one another. Permissible tolerances for this positioning are generally closer than tolerances associated with assembly of mechanical tracking components. The illumination pattern is also important. It is preferable for the tracking surface to be diffusely and evenly illuminated, with "bright" and "dead" spots minimized. It is also important for the illumination pattern to be as uniform as possible from device to device.

Existing optically-tracking devices direct light to a target area in various manners. In some cases, the LED is positioned between the image sensor and the target surface. Although simple in some respects, this configuration can add additional steps to an assembly process, and can also be a potential source of errors because of improper alignment. Moreover, many commercially available LEDs are not optimized for direct illumination of a near-field object (such as a target area of a tracking surface), resulting in less-than-desirable illumination patterns. Other configurations use a light guide to direct light from a LED to the target area. One such configuration is shown in FIG. 1B, in which components 1*b*–8*b* are generally similar to components 1*a*–8*a* of FIG. 1A. In the configuration of FIG. 1B, however, light from LED 4*b* is transmitted to the target area T via light guide 9*b*. Typically, light guide 9*b* is formed from light-transmissive material such as glass or plastic. The light from LED 4*b* enters light guide 9*b* and reflects from the internal surfaces of the material, and then exits from an exit face e to illuminate the target area. Although addressing some problems of direct illumination, the configuration of FIG. 1B still fails to illuminate the target area as desired, causing dead spots and/or bright spots. The presence of dead and bright spots leads to Fixed Pattern Noise (FPN) and degrades imaging accuracy. Accordingly, there remains a need for improved methods and systems of illuminating target areas in optically tracking devices.

SUMMARY OF THE INVENTION

The present invention addresses many of the challenges described above. In particular, the present invention provides a light guide for illuminating a target area for imaging. The light guide includes at least two channels from which light is shined on the target area. By illuminating the target area with multiple channels, light is dispersed across the target area more uniformly and with fewer dead or bright spots. In one preferred embodiment, a light guide includes at least two channels that are separated from one another. An entrance surface of the light guide receives light emitted by a light source. The received light is divided between the channels, and the divided light is then directed from respective exit faces of the channels. The entrance surface and the channels may be integral to one another, and may be molded from various materials. The light guide may further include an integral holder for supporting and aligning a LED light source to shine upon the entrance surface. The entrance surface may also be formed as a collection lens. In one preferred embodiment, the channels direct light onto a target area at different angles. In other embodiments, the channel faces from which light emanates are non-planar. The non-planar face(s) may be faceted, may be formed as refractive elements (e.g., a concave lens) or may have other non-planar surfaces. Other features and advantages of the invention are described herein and in the accompanying drawings, or will be apparent to persons skilled in the art once provided with the following description and accompanying drawings.

DETAILED DESCRIPTION OF THE INVENTION

The invention is described using an optically-tracking computer mouse as an example of a device into which the invention may be incorporated. However, the invention is not limited to computer mice.

Figure 1A:
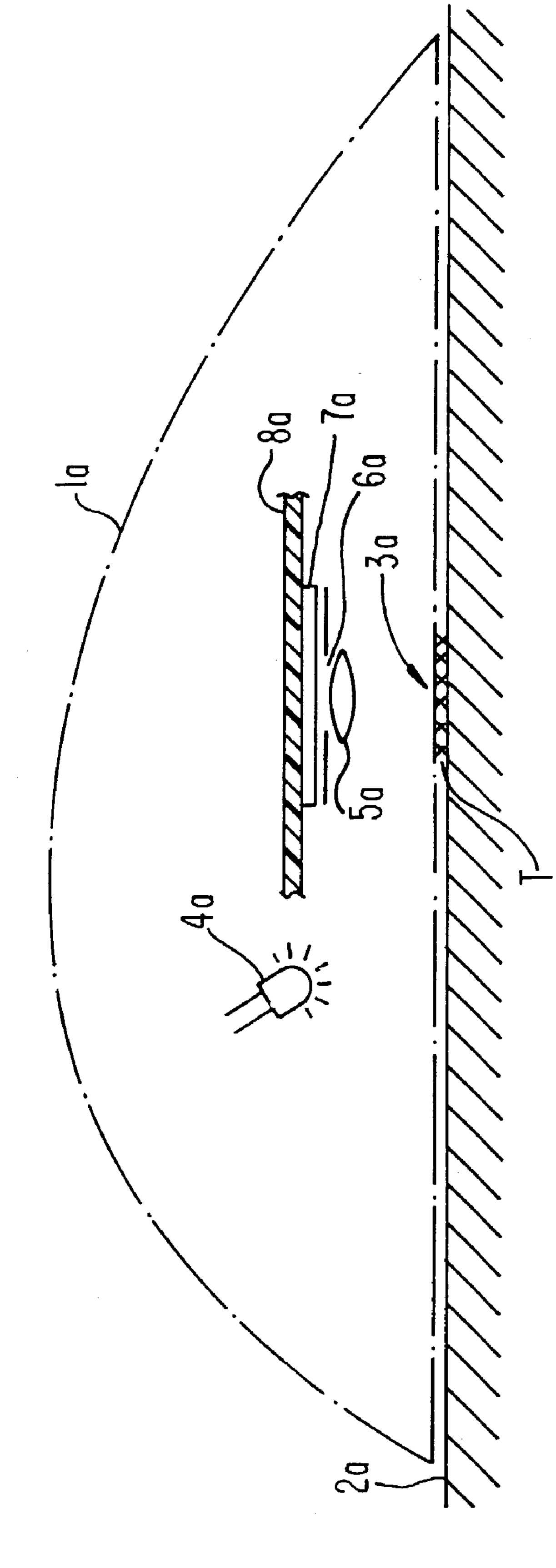
FIG. 1A is schematic drawing of components in an existing optically-tracking computer mouse.
Figure 1B:
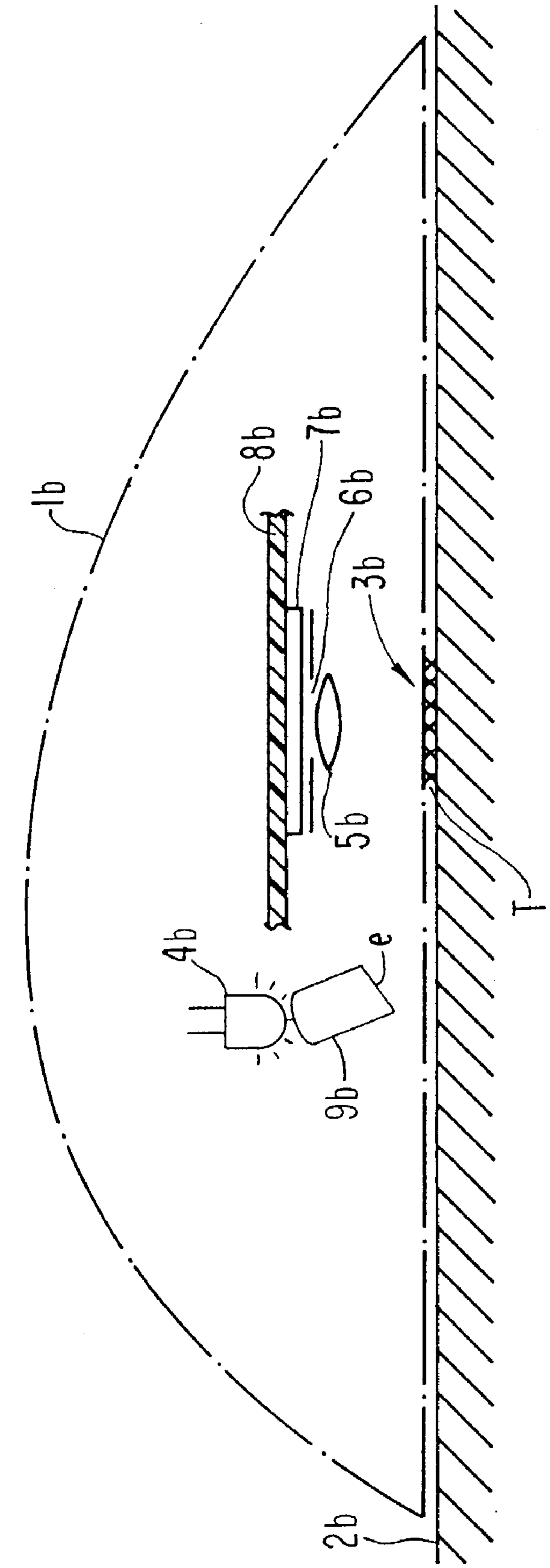
FIG. 1B is a schematic drawing of one existing arrangement for illuminating a target area.
Figure 2:
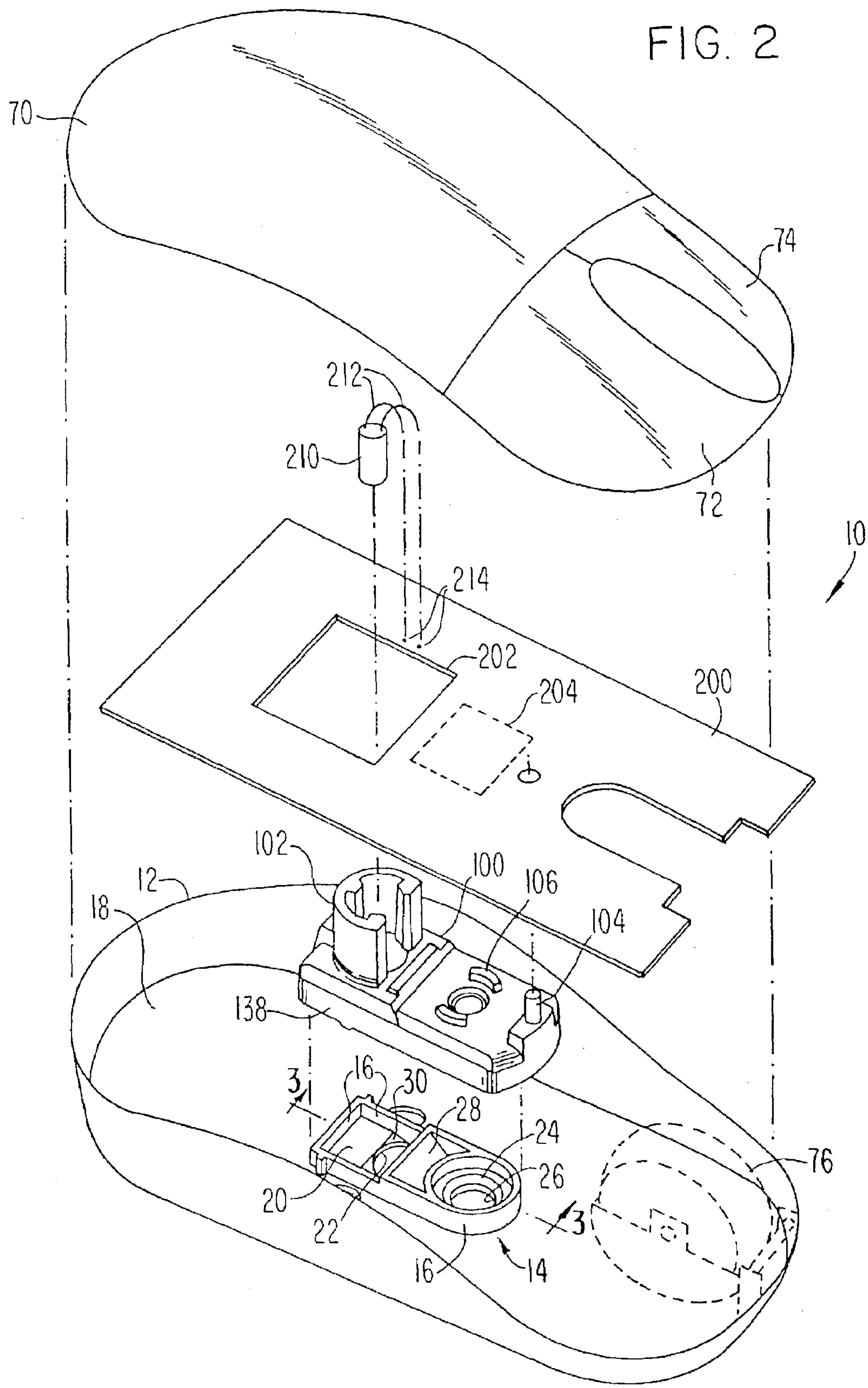
FIG. 2 is an "exploded" view of a computer mouse incorporating an optical structure according to one embodiment of the invention.
Figure 3:
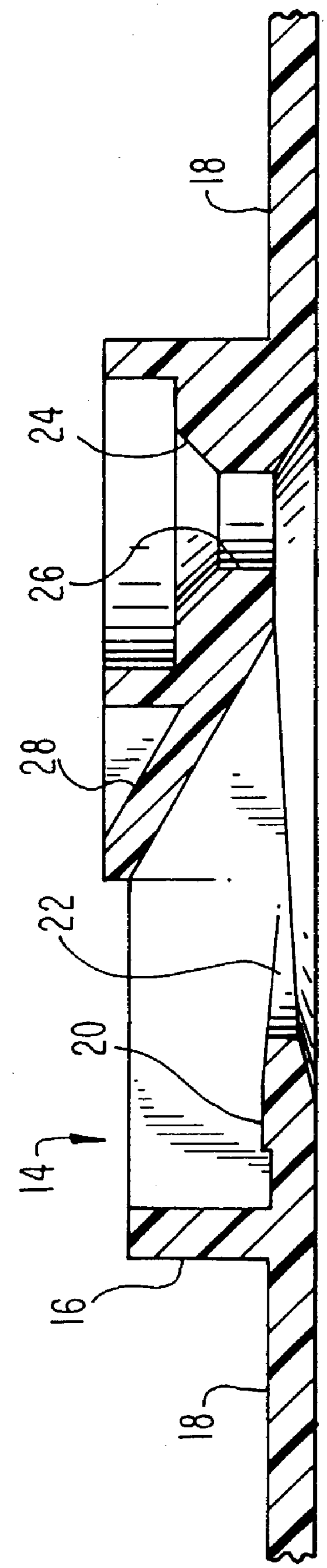
FIG. 3 is a cross section taken along lines 3—3 of FIG. 2.

FIG. 2 is an "exploded" view of portions of a computer mouse 10 incorporating an optical structure 100 according to one preferred embodiment of the invention. Housing base 12 is configured to rest upon and move over a desk top or other tracking surface, as well as to support and contain other components. Housing base 12 may be molded from ABS (acrylonitrile butadiene styrene) or other suitable material. Formed in the interior of housing base 12 is an access/support structure 14. FIG. 3 is a cross section of access/support structure 14 taken along line 3—3 in FIG. 2. Access/support structure 14 includes walls 16 extending upward from the interior bottom surface 18 of housing base 12. Access/support structure 14 includes a first well 20. Located in the bottom of first well 20 is a transmission hole 22. Located at the other end of access/support structure 14 is a second well 24. Located in the center of second well 24 is a receiving hole 26. Separating wells 20 and 24 is a baffle 28. Mouse 10 also has an upper housing 70, which may have one or more buttons 72, 74, an opening for a scroll wheel 76, and other mechanisms for receiving user input. Mouse 10 would typically include numerous other components such as a battery (if mouse 10 is wireless), various connectors, cabling, etc. So as not to obscure FIG. 2 with unnecessary detail, these additional components are not shown, but would be understood as present by persons skilled in the art.

Optical structure 100 fits over access/support structure 14. Located on one end of optical structure 100 and extending upward is LED support 102. Also located on optical structure 100 and extending upward may be a positioning post 104 and spacer/shield wall 106. As shown in FIG. 2, positioning post 104 cooperates with a hole in printed circuit board (PCB) 200 to position and stabilize optical structure 100 with respect to PCB 200. Spacer/shield wall 106 may also be formed so as to position and stabilize optical structure 100 with respect to PCB 200. In alternate embodiments, either or both of positioning post 104 and spacer/shield wall 106 may be absent. LED support 102 extends through an opening 202 in PCB 200. Image sensor 204 is positioned adjacent to opening 202 on the underside of PCB 200. When assembled, LED 210 is positioned vertically downward inside of LED support 102 (see FIG. 7). Leads 212 from LED 210 are soldered to PCB connection points 214. Different types of LEDs may be used in connection with the invention. In one preferred embodiment, a T1¾ size LED producing light at approximately 630 nm is used. Such an LED is available from Agilent Technologies of Palo Alto, Calif. having part number HLMP-EG24-RU000. LEDs producing light at other wavelengths and having other or different features may also be used. Light sources other than LEDs could also be used.

Image sensor 204 contains multiple light sensitive elements and can be used to create electrical signals representing an image. In one preferred embodiment, image sensor 204 is an integrated circuit containing both the light sensitive elements and the circuitry for converting the received light into electrical signals. On such device is described in commonly-owned U.S. patent application Ser. No. 10/305,062, titled "Photo-Sensor Array for Motion Detection" and filed Nov. 27, 2002, incorporated by reference herein. Other image sensor integrated circuits are known in the art and are commercially available. One such sensor is available from Agilent Technologies and has part number ADNS-2620. Other image sensing components are described in the aforementioned U.S. Pat. Nos. 6,172,354, 6,303,924 and 6,373,047 (including documents referenced therein). In other embodiments, image sensor 204 may only contain light sensitive components, with the associated conversion circuitry located elsewhere.

Figure 4:
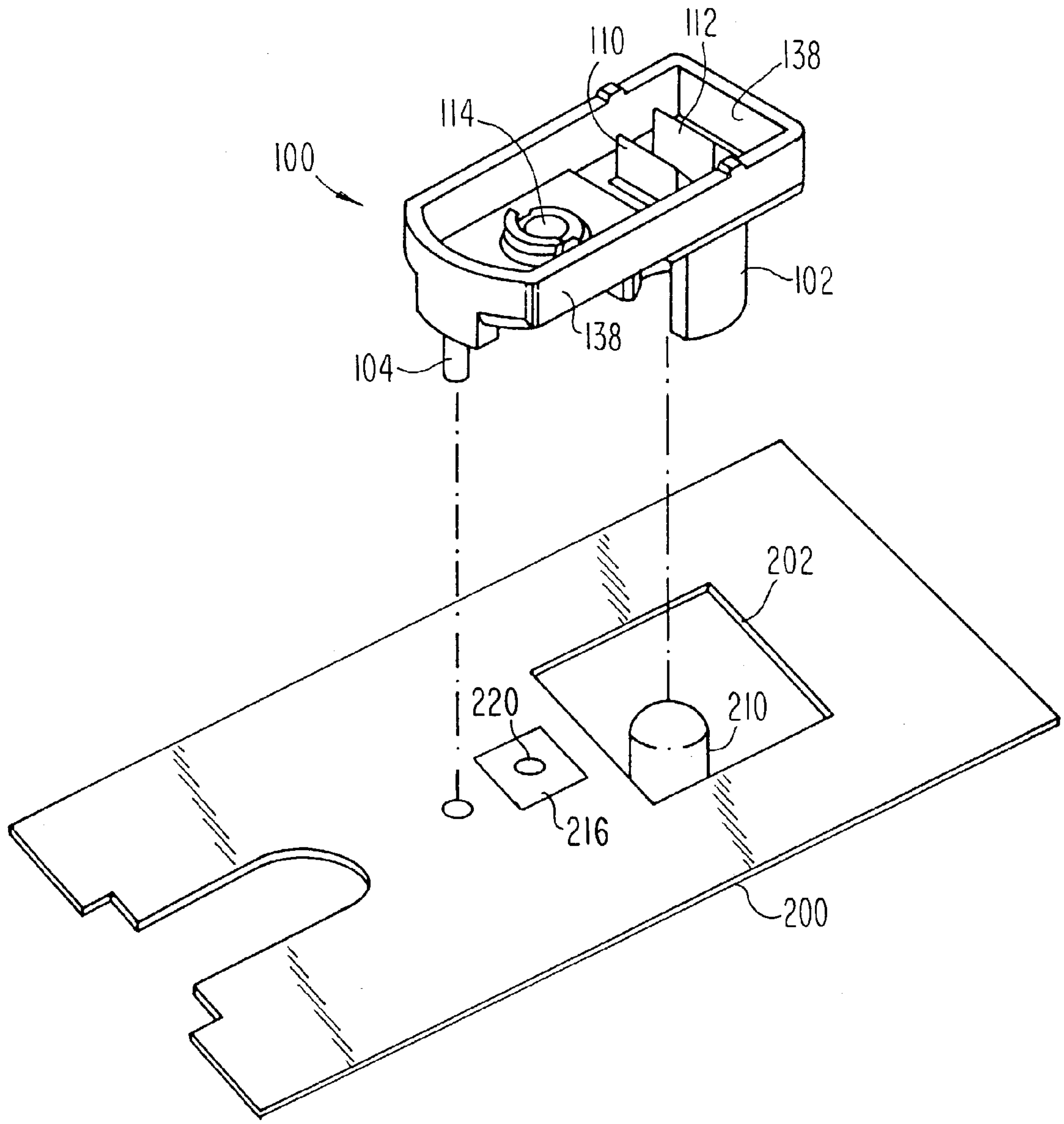
FIG. 4 is an inverted "exploded" partial view of the computer mouse of FIG. 2.

FIG. 4 is similar to FIG. 2, but inverted so as to expose the underside of PCB 200 and optical structure 100. FIG. 4 shows LED 210 in place, and omits housing base 12. Aperture plate 216 covers image sensor 204 (not shown in FIG. 4) and has an aperture 220 formed therein. Light enters aperture 220 and strikes photo-sensitive regions of image sensor 204. In other embodiments, aperture plate 216 could be situated on the underside of PCB 200 and image sensor 204 on the upper side of PCB 200, with an opening in PCB 200 between image sensor 204 and aperture plate 216. Aperture plate 216 may be integrated with image sensor 204 prior to attachment to PCB 200, may be formed as an integral component of the image sensor, or may be attached as a separate piece to PCB 200. Exposed on the underside of optical structure 100 are two light guide channels 110 and 112, which are further described below. Also shown on the underside of optical structure 100 is imaging lens 114 (also described below).

Figure 5:
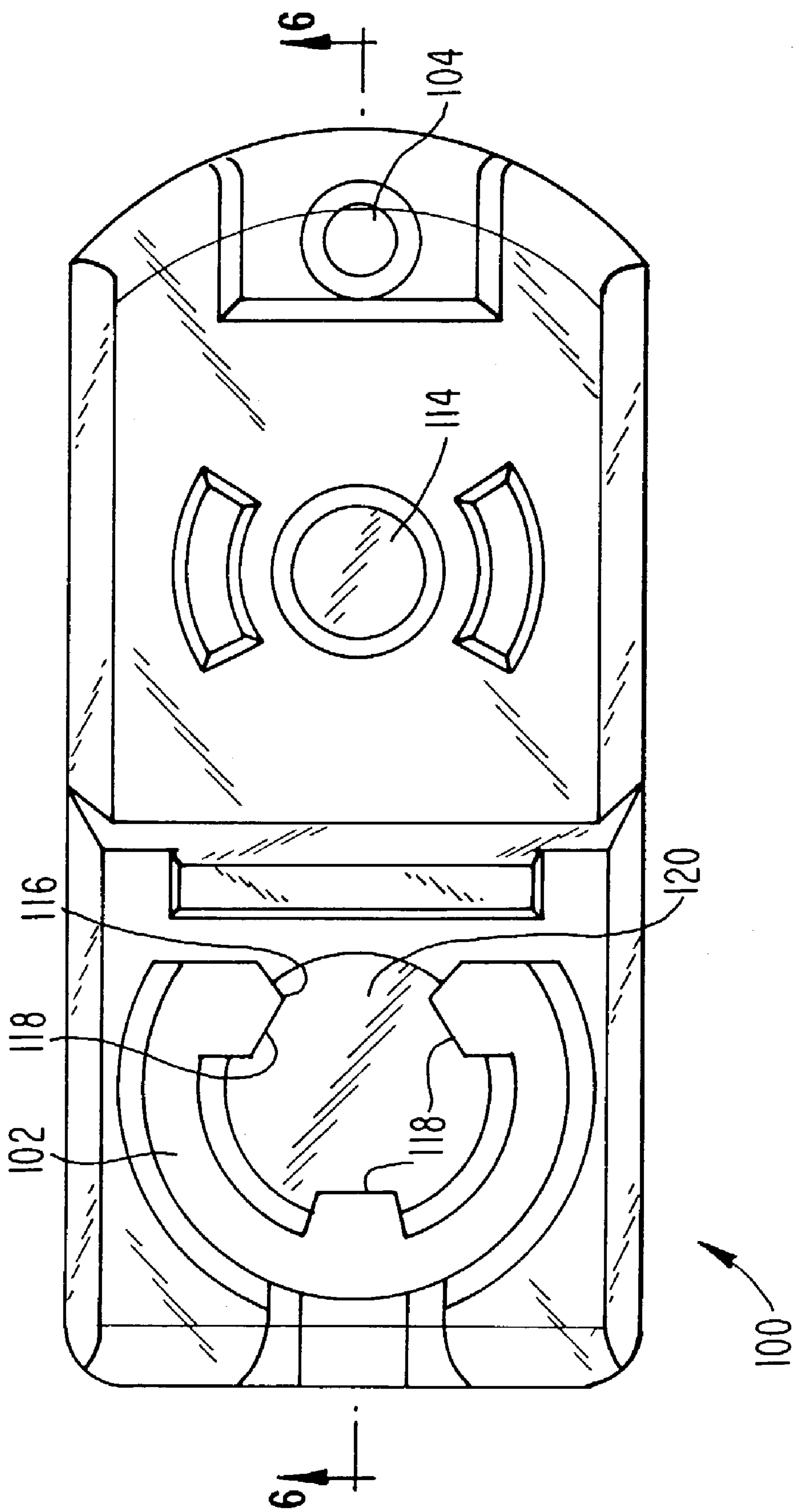
FIG. 5 is a top view of an optical structure according to one embodiment of the invention.
Figure 6:
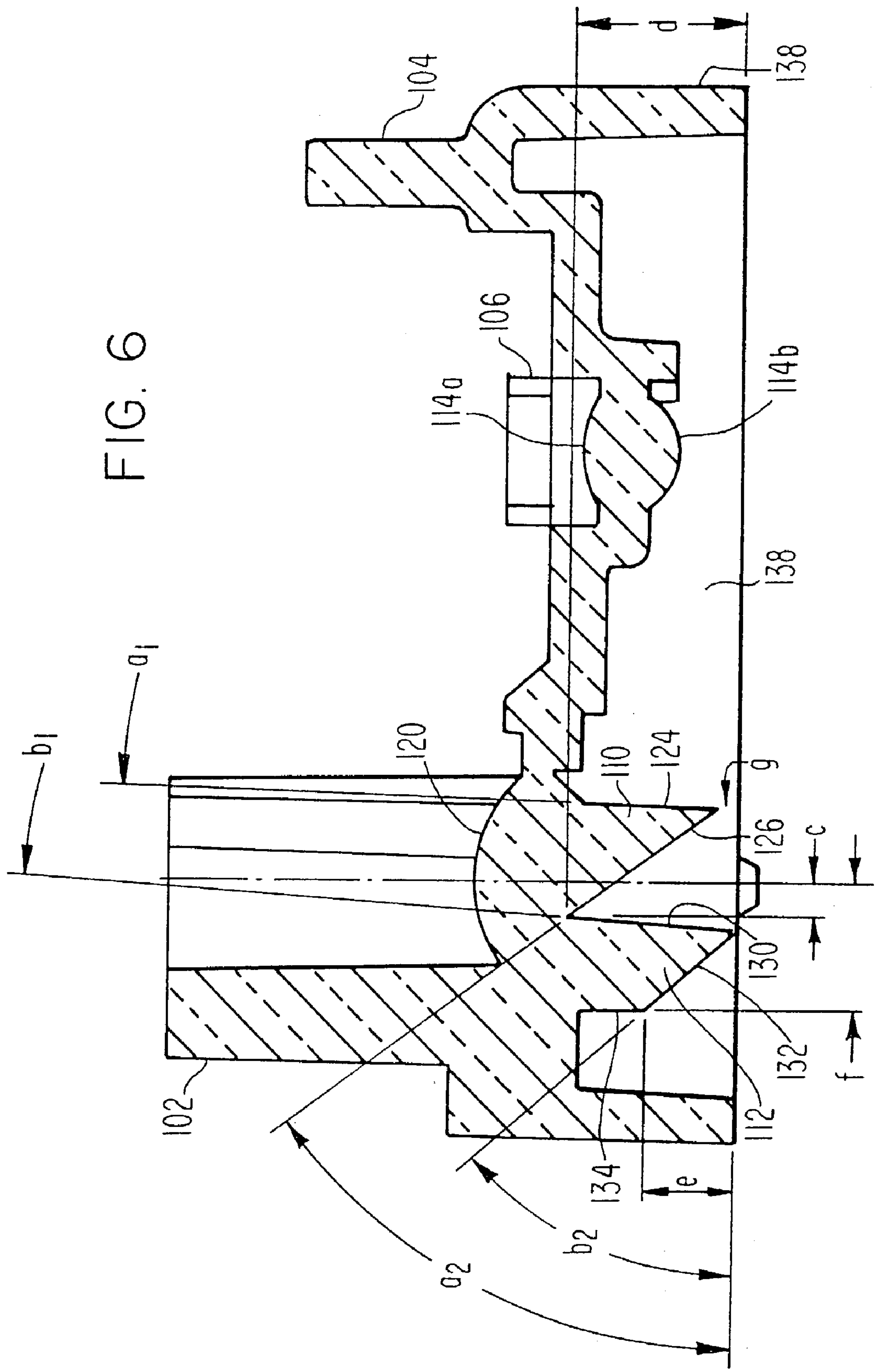
FIG. 6 is a cross section taken along lines 6—6 of FIG. 5.

FIGS. 5 and 6 show optical structure 100 in more detail. FIG. 5 is a top view of optical structure 100. LED support 102 is formed as a hollow cylinder, and has a vertical opening 116 on one side. Upon assembly, LED 210 is positioned inside the cylinder of LED support 102 and pointing vertically downward. Three vertical locating ridges 118 are formed inside of LED support 102 and serve to align LED 210. Formed in the bottom of LED support 102 is a collection lens 120. Collection lens 120 collects light emitted by LED 210 and directs that light to the tracking surface target area via channels 110 and 112. Also formed in optical structure 100 is an imaging lens 114. Imaging lens 114 collects and focuses light reflected from a target area and directs that light through aperture 220 in aperture plate 216.

FIG. 6 is a cross section of optical structure 100 taken along lines 6—6 of FIG. 5. Collection lens 120 and channels 110 and 112 form a light guide for directing light from LED 210 (when placed in support 102) to a target area. This light guide receives light from LED 210, divides that light between two channels 110 and 112 having stepped front faces (as described below), and rejoins that light by directing it to the target area. Channels 110 and 112 are located on the underside of LED support 102. Front channel 110 has a front face 124 and a rear face 126. Rear face 126 forms a Total Internal Reflecting (TIR) surface. A portion of the light emitted by LED 210 and entering collection lens 120 is diverted to channel 110. This diverted light is then reflected by the TIR surface and exits channel 110 through front face 124. Rear channel 112 has a front face 130, a rear face 132, and a rear vertical face 134. Rear face 132 also forms a TIR surface. A portion of the light from LED 210 entering collection lens 120 is diverted to channel 112. This portion of the light is reflected by the TIR surface of rear face 132 and exits channel 112 through front face 130. Front faces 124 and 130 form a stepped arrangement relative to one another. In other words, front faces 124 and 130 lie in generally parallel planes, but are offset by an amount g by which the rear channel 112 extends further downward than front channel 110. Channels 110 and 112 are separated by a space bounded by the rear face 126 of front channel 110 and the front face 130 of rear channel 112. This separation between the channels is filled with a material (air in this case) that is dissimilar to that of the channels. In a preferred embodiment, channels 110 and 112 have the following dimensions (referring to FIG. 6):

TABLE 1

| | | |
|---|---|---|
| $a_1$ | (angle of front channel front face to horizontal) | 88.0° |
| $a_2$ | (angle of front channel rear face to horizontal) | 52.5° |
| $b_1$ | (angle of rear channel front face to horizontal) | 88.0° |
| $b_2$ | (angle of rear channel rear face to horizontal) | 47.5° |
| c | (distance from top of front channel rear face to collection lens centerline) | 0.872 in. |
| d | (height of top of front channel rear face) | 4.880 in. |
| e | (height of top of rear channel rear face) | 2.930 in. |
| f | (distance from top of rear channel rear face to collection lens centerline) | 3.402 in. |

As seen in FIGS. 4 and 6, a vertical wall 138 surrounds the underside of optical structure 100. Channels 110 and 112 are inside the perimeter of wall 138, as is imaging lens 114. Upon assembly, optical structure 100 fits over access/support structure 14, with walls 138 of optical support structure 100 surrounding walls 16 of access/support structure 14.

Optical structure 100 is preferably molded as an integral component. Possible materials for optical structure 100 include clear polystyrene available from BASF Corporation of Mount Olive, N.J., grade 148G KG21; clear polystyrene available from Nova Chemicals Corporation of Moon Township, Pa., grade PS1300; LEXAN polycarbonate resin available from GE Plastics of Fairfield, Conn., grade 121R, color 1111; and MAKROLON polycarbonate resin available from Bayer Polymers of Pittsburgh, Pa., grade 2405, color 1000. Other possible materials include acrylic, cyclic olefin copolymer, SAN styrene blend and NAS styrene blend.

Imaging lens 114 includes upper and lower convex lenses $\mathbf{114}_a$ and $\mathbf{114}_b$. The refractive power and other optical properties of imaging lens 114 may vary based upon distance from image sensor 204, distance of image sensor 204 above the tracking surface, the specific design of image sensor 204, and other configuration choices. The determination of imaging lens optical requirements is within the routine ability of a person skilled in the art once provided with the descriptions herein and various design parameters. Similarly, the preferred refractive power and other optical properties of collection lens 120 may vary based on parameters such as size of LED 210, size of channels 110 and 112, distances from a target area, and other configuration choices. The determination of collection lens optical requirements is likewise within the routine ability of a person skilled in the art once provided with the descriptions herein and the relevant design parameters. In one preferred embodiment, collection lens 120 causes light emanating from channels 110 and 112 to be slightly out of focus. In this manner, light is more evenly spread onto the target area of the tracking surface.

Figure 7:
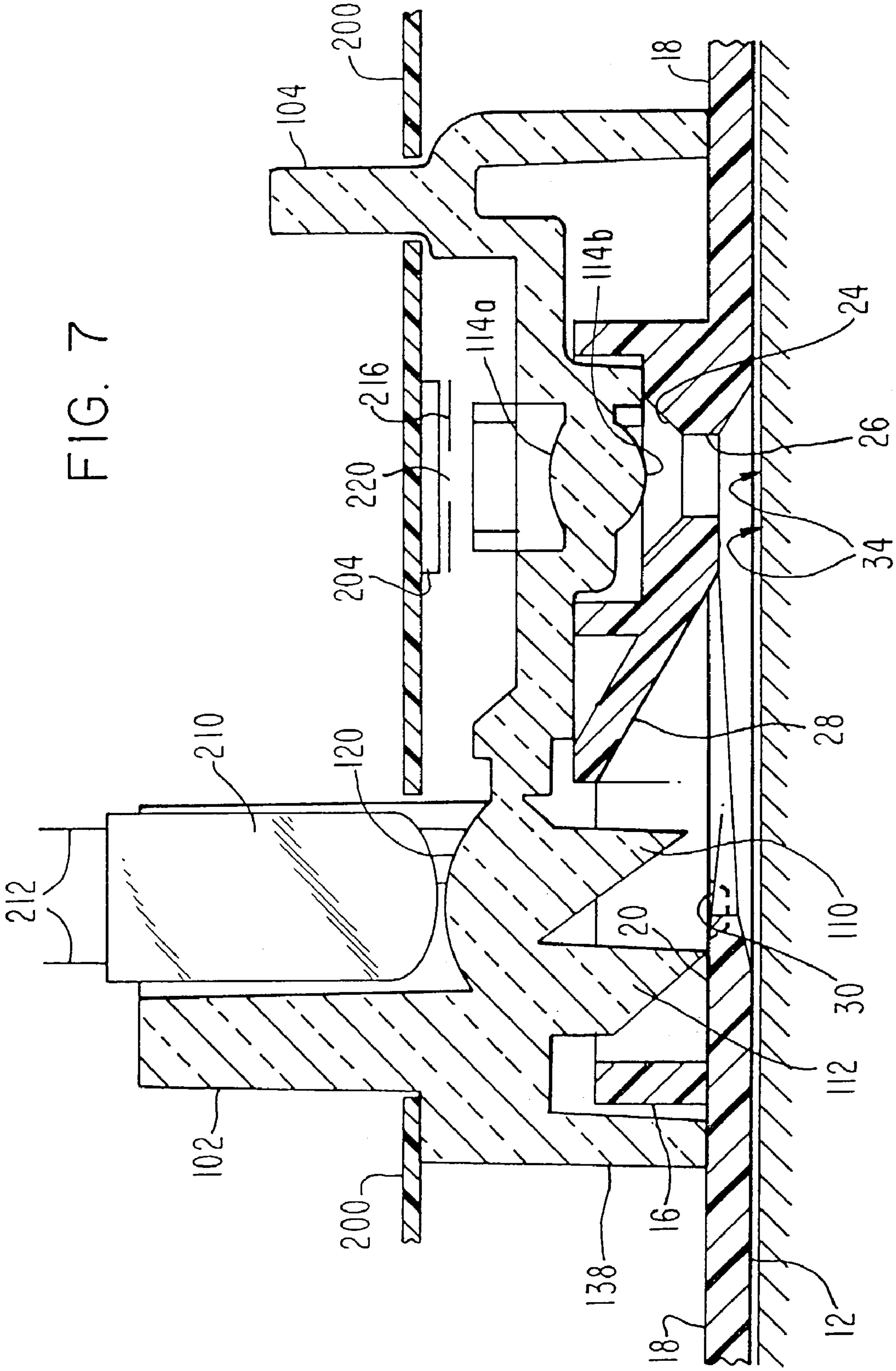
FIG. 7 is a cross section of an optical structure shown in FIG. 6 when assembled with other components.

FIG. 7 is a cross section of optical structure 100, access/support structure 14, PCB 200, image sensor 204 and LED 210 in an assembled condition. Channels 110 and 112 rest within and to the rear of first well 20 of access/support structure 14. Baffle 28 (which also prevents or minimizes stray light from reaching imaging lens 114), together with a beveled edge 30 on transmission hole 22, defines boundaries for an angled path for light from channels 110 and 112 to target area 34. Light exiting from front faces 124 and 130 of channels 110 and 112 shines upon and illuminates target area 34. The arrows showing target area 34 only approximate the location and extent of the target area for purposes of illustration. A portion of this light is then reflected upward from target area 34 through entrance hole 26 to imaging lens 114. Imaging lens 114 then collects and focuses this reflected light and directs it into aperture 220 of aperture plate 216. The light then passes through aperture 220 and reaches the photo-sensitive elements of image sensor 204.

Figure 8:
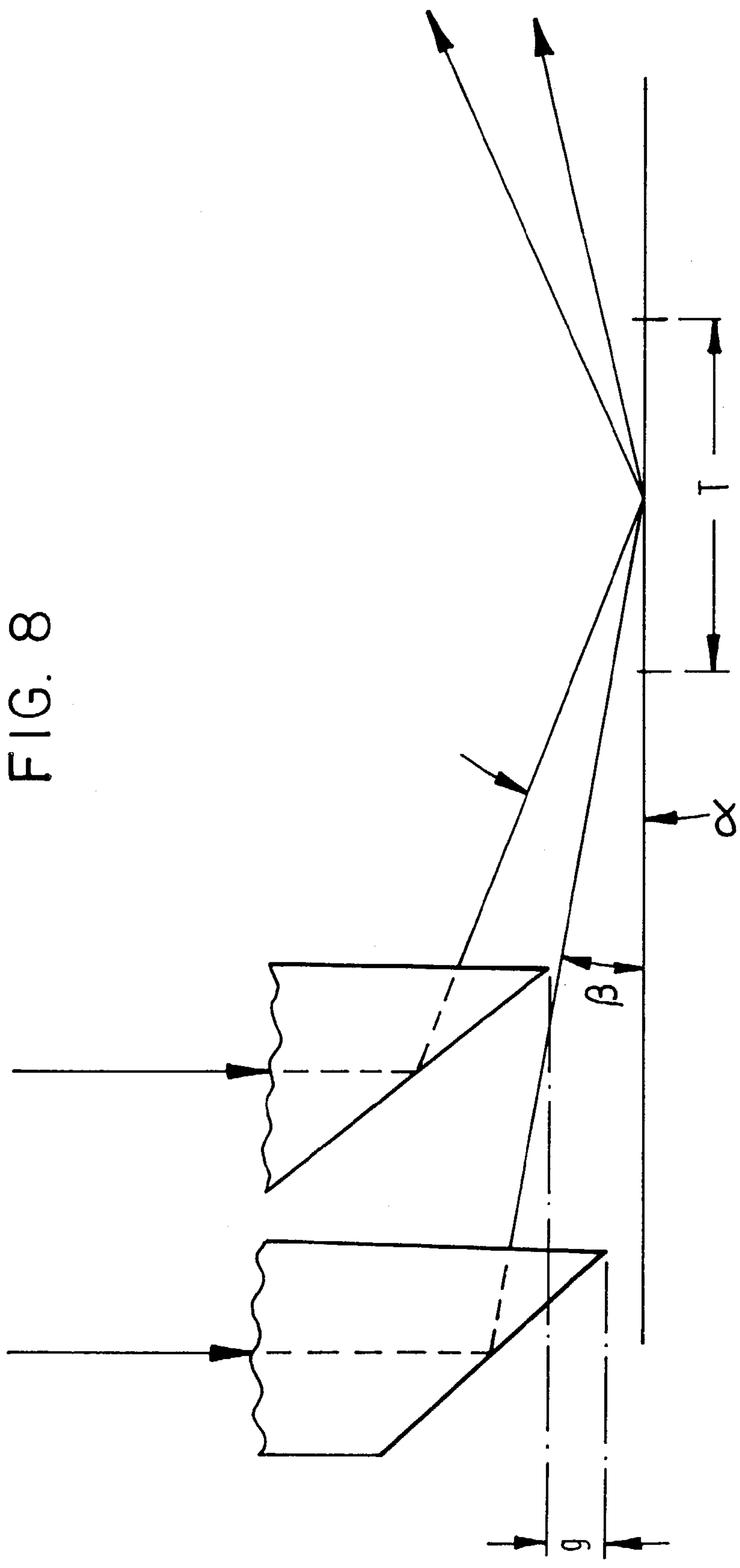
FIG. 8 is a schematic drawing showing operation of a multi-channel light guide according to one embodiment of the invention.
Figure 9:
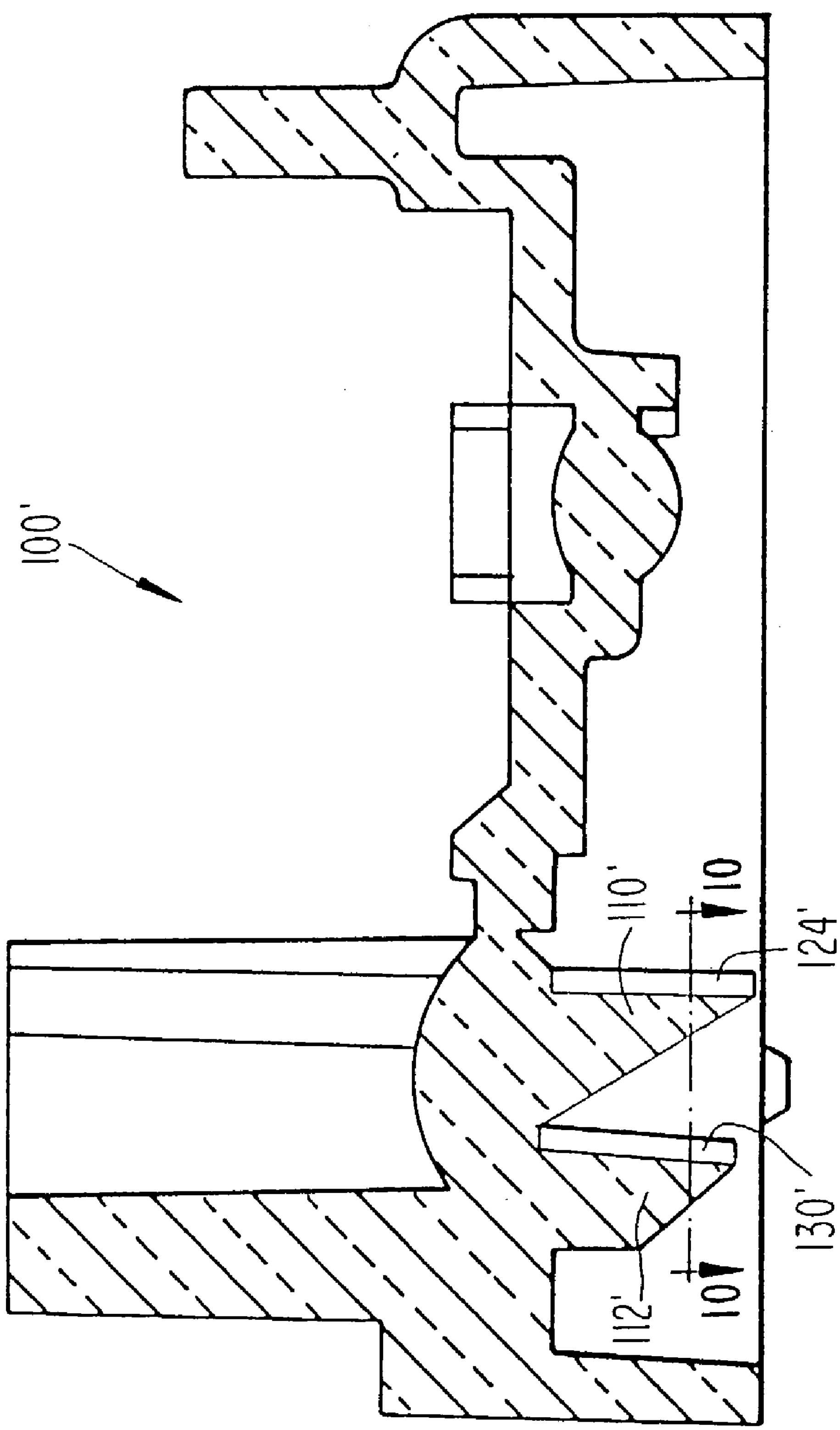
FIG. 9 is a cross section of an optical structure according to another embodiment of the invention.

FIG. 8 schematically shows operation of optical structure 100 and advantages provided over other systems for directing illumination to a target surface. In FIG. 8, the arrows generally show the directions in which most of the light is directed through channels 110 and 112. Because of scattering and other effects, however, there will also be light transmitted in other directions. Light from front channel 110 exits the front face 124 at a first angle α. Light exits the front face 130 of rear channel 112 at an angle β, which is shallower than angle α. There is a gap g between the lowest portion of channel 110 and the lowest portion of channel 112. Light from rear channel 112 and front channel 110 simultaneously illuminates the target area T. By illuminating from two different angles, light is more evenly distributed across the target area, and non-uniform illumination is reduced. Light can be divided between channels 110 and 112 in any proportion. Preferably, a majority of the light from LED 210 is directed into channel 110, and a smaller portion of light is directed into channel 112. In one preferred embodiment, channels 110 and 112 are formed such that approximately 80% of the target area illumination comes from front channel 110, and approximately 20% of the target area illumination comes from rear channel 112. In that embodiment, light is directed to the target area from the front channel at an angle of approximately 70° from the vertical (or approximately 20° from the horizontal). Light is directed to the target area from the rear channel at approximately 80° from the vertical (or approximately 10° from the horizontal). In other embodiments, approximately 50%–90% of light reaching the target area comes from front channel 110, and approximately 10%–40% of light reaching the target area comes from rear channel 112. In yet other embodiments, approximately 70%–90% of light reaching the target area comes from front channel 110, and approximately 10%–30% of light reaching the target area comes from rear channel 112. In still other embodiments, light is directed to the target area from the front channel at an angle of approximately 50°–85° from the vertical (or approximately 5°–40° from the horizontal), and light is directed to the target area from the rear channel at approximately 50°–85° from the vertical (or approximately 5°–40° from the horizontal), although at a shallower angle than light from the front channel.

Figure 10:
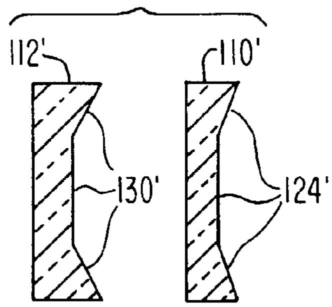
FIG. 10 is a cross section taken along lines 10—10 of FIG. 9.
Figure 11:
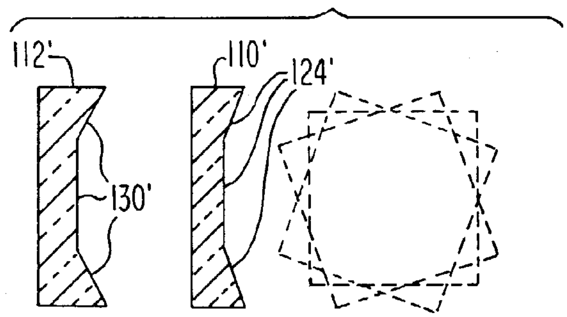
FIG. 11 is a drawing schematically showing light patterns from the optical structure of FIGS. 9 and 10.
Figure 13:
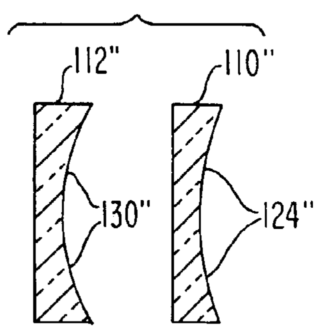
FIG. 13 is a cross section taken along lines 13—13 of FIG. 12.
Figure 14:
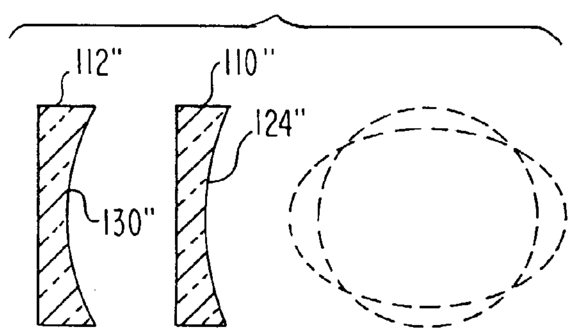
FIG. 14 is a drawing schematically showing light patterns from the optical structure of FIGS. 12 and 13.
Figure 12:
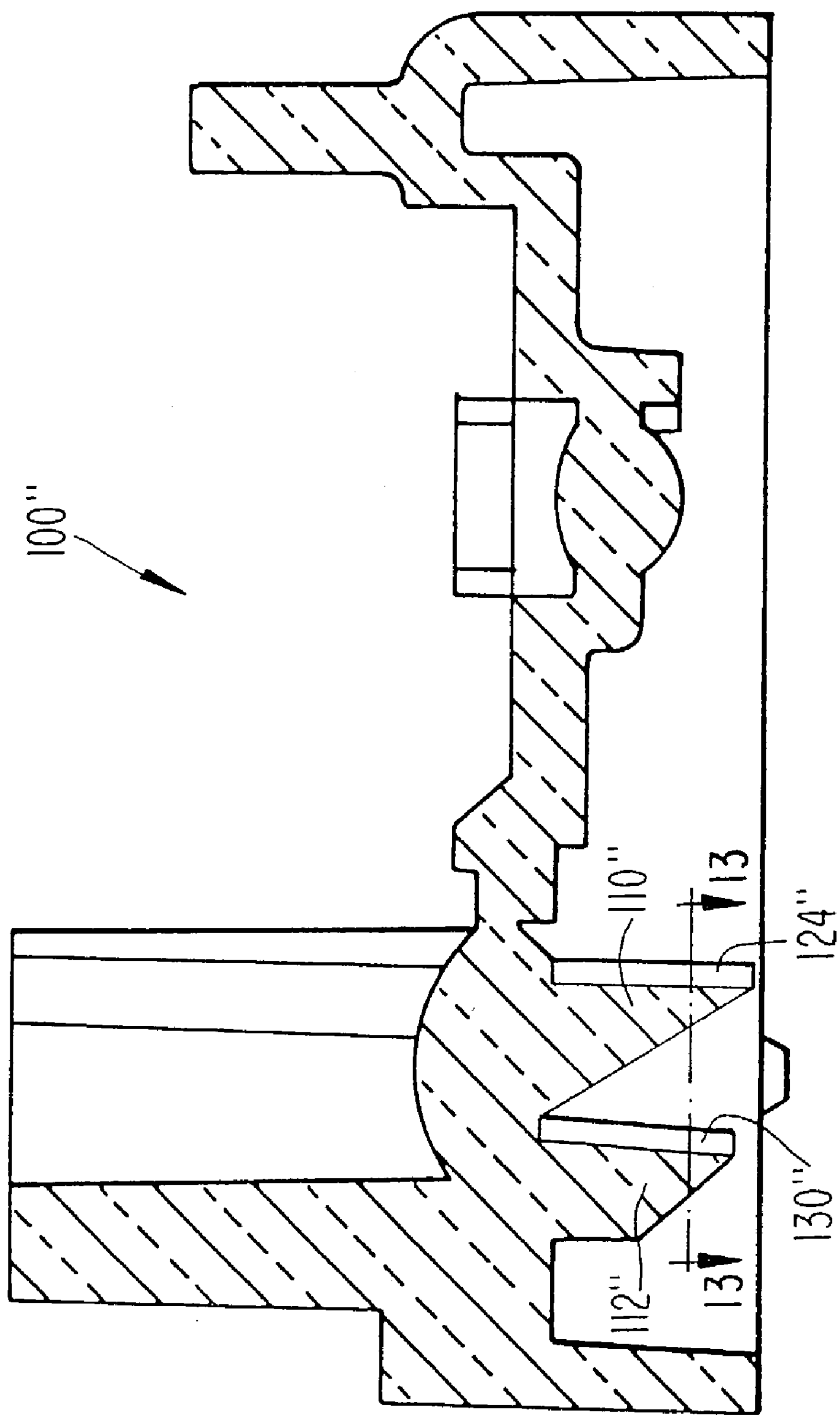
FIG. 12 is a cross section of an optical structure according to another embodiment of the invention.
Figure 15A:
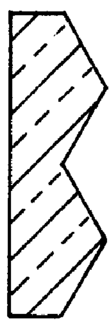
FIGS. 15A–15F are cross sections of a portion of an optical structure according to additional embodiments of the invention.
Figure 15B:
Figure 15C:
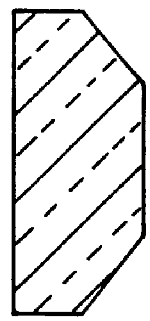
Figure 15D:
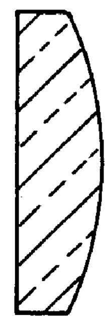
Figure 15E:
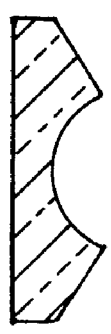
Figure 15F:
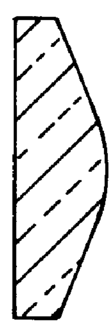

FIGS. 9–14 show additional embodiments of an optical structure 100' and 100". Optical structure 100' (FIG. 9) is substantially similar to optical structure 100 except for the configurations of front faces 124' and 130' of channels 110' and 112'. As shown in FIG. 10, a cross section taken along lines 10—10 of FIG. 9, the front faces 124' and 130' are not planar. Instead, each channel front face is faceted. In this manner, light can be more evenly distributed across the target area. FIG. 11 schematically shows light shined on a target area by front faces 124' and 130'. Each facet will generally direct most of its light to a portion of the target area, with those portions substantially overlapping. Because of scattering and other effects, however, some light is also transmitted in other directions and in regions outside of the general illumination patterns shown. As shown in FIG. 11, faceted front faces 124' and 130' do not shine all light in the same areas, but their illumination patterns do substantially overlap. To simplify FIG. 11, only three boxes are shown for the patterns caused by various facets, and not six boxes (one for each facet). Although channels 110' and 112' each has three facets, the number of facets can be varied. Optical structure 100" (FIG. 12) is also similar to optical structure 100 except for the shape of the front faces 124" and 130" of channels 110" and 112". In this embodiment, and as shown in FIG. 13, the front faces 124" and 130" are formed as curvilinear concave refractive surfaces. As shown in FIG. 14, front faces 124" and 130" are configured to spread light across the target area out of focus, i.e. over a larger spot size, thereby distributing light more evenly. The non-planar front face(s) of the channels could take other forms. For example, the front face of one or more of the channels could have a cross-section in a form such as is shown in one of FIGS. 15A through 15F. FIGS. 15A–15F are cross sections of a single channel taken in a location similar to that of line 10—10 in FIG. 9, with the proportions slightly exaggerated for clarity of illustration. FIGS. 15A–15C are examples of other forms of a faceted front face. FIG. 15D is an example of a curvilinear convex front face. FIG. 15E is an example of a combination faceted-concave front face. FIG. 15F is an example of a combination faceted-convex front face. In some embodiments, one front face may be planar and the other non-planar (whether faceted, convex, concave, combination convex-faceted or combination concave-faceted). In still other embodiments, one front face may be one type of non-planar face and another front face may be another type of non-planar face.

As can be appreciated from the above description, an optical structure according to the invention provides numerous other advantages over the prior art. Instead of separate structures for mounting and aligning a LED, for guiding light to the target area and for focusing and directing reflected light, a single structure is provided. Because only a single structure is needed, overall costs are reduced. Moreover, reducing the number of pieces permits close tolerances to be more easily maintained during assembly. By dividing light into multiple channels and then redirecting that light onto a target area from different directions, light is blended and more evenly distributed across the target area. In addition to reducing non-uniform illumination, this arrangement can also minimize effects caused by manufacturing defects in the collection lens, the imaging lens, the channels, or in other components. Multiple channels according to the invention also use less plastic than other designs. In addition to reducing molding time and part cost, this results in less light absorption, thereby allowing more light from the LED to reach the target area.

Although several examples of carrying out the invention have been described, those skilled in the art will appreciate that there are numerous variations and permutations of the above described examples that fall within the spirit and scope of the invention. As but one example, a multi-channel light guide according to the invention need not be used in conjunction with a corresponding support structure such as access/support structure 14. Similarly, a multi-channel light guide according to the invention need not be formed as part of a unitary optical structure having other optical components or supporting structures. Numerous other configurations are possible. As but one other example, more than two channels could be implemented. One, some or all of the additional channels could also have a non-planar front face. These and other modifications are within the scope of the invention, which is only limited by the attached claims.

The invention claimed is:

1. A computer mouse configured to optically track motion of the mouse relative to a supporting surface, comprising:

a housing, the housing having a first region through which light may be transmitted and received;

a light source contained within the housing;

a light guide including at least first and second channels separated from one another, and wherein the first channel includes a first exit face, the second channel includes a second exit face, and the light guide is positioned to receive light emitted by the light source, to divide the received light between the first and second channels, and to direct the divided light from the first and second exit faces and through the housing first region so as to be rejoined upon a target area of the supporting surface; and an image sensor contained within the housing and positioned to receive the light directed from the first and second exit faces after the directed light has been rejoined on and reflected from the target area.

2. The device of claim 1, wherein the first and second channels are integral to the light guide, and wherein the first and second exit faces do not lie in the same plane.

3. The device of claim 2, wherein the light guide includes an integral collecting lens positioned between the light source and the first and second channels.

4. The device of claim 3, wherein the light guide is molded from one of polycarbonate, polystyrene, acrylic, cyclic olefin copolymer, SAN styrene blend and NAS styrene blend.

5. The device of claim 2, wherein the light source comprises a Light Emitting Diode (LED), and wherein the light guide further includes an integral holder to support and position the LED.

6. The device of claim 5, further including a substrate for supporting and interconnecting electronic components, and wherein the image sensor is attached to the substrate, the light guide is configured for direct attachment to the substrate, and at least a substantial portion of the light guide is positioned between the substrate and the housing first region.

7. A computer input device for optically tracking motion of the device, comprising:

a housing, the housing having a first region through which light may be transmitted and received;

a light source contained within the housing;

a light guide including at least two channels separated from one another, the light guide formed so as to:

receive light emitted by the light source, divide the received light between the at least two channels, and direct the divided light from respective exit faces of the at least two channels through the housing first region; and an image sensor contained within the housing and positioned to receive the light from the light guide after the light has been reflected back through the housing first region, and wherein each of the at least two channels further comprises a reflecting face which internally reflects light so as cause same to emanate from the exit face, and one of the at least two channels extends further than another channel.

8. The device of claim 1, wherein, each of the first and second channels further comprises a reflecting face which internally reflects light so as cause same to respectively emanate from the first and second exit faces, and the first and second exit faces lie in substantially parallel planes.

9. The device of claim 1, wherein each of the first and second channels further comprises a reflecting face which internally reflects light so as cause same to respectively emanate from the first and second exit faces, and light emanates from the first exit face at substantially a first angle to the target area and from the second exit face at substantially a second angle to the target area.

10. The device of claim 9, wherein the first angle is between 10° and 40° from the target area and the second angle is between 5° and 30° from the target area.

11. The device of claim 9, wherein the first angle is between 5° and 40° and the second angle is also between 5° and 40°, with the second angle being shallower than the first angle.

12. The device of claim 9 wherein the first angle is approximately 20° from the target area and the second angle is approximately 10° from the target area.

13. The device of claim 1, wherein each of the first and second channels further comprises a reflecting face which internally reflects light so as cause same to respectively emanate from the first and second exit faces, and the first exit face is not planar.

14. The device of claim 13, wherein the first exit face comprises multiple facets.

15. The device of claim 13, wherein at least a portion of the first exit face is formed as a curvilinear concave or convex refractive surface.

16. The device of claim 15, wherein the first exit face comprises multiple facets and a curvilinear concave portion.

17. A light guide for use in connection with an optically-tracking motion sensor usable in a computer input device, comprising:

an entrance surface for receiving light emitted by a light source;

a first channel for directing light from the entrance surface through a first exit face to a tracked surface; and a second channel for directing light from the entrance surface through a second exit face to the tracked surface, the first and second channels being separated from one another and configured such that light incident upon the entrance surface is divided between the first and second channels, and the first and second exit faces being non-coplanar.

18. The light guide of claim 17, wherein the first and second channels are integral to the entrance surface.

19. The light guide of claim 18, further comprising an integral holder for supporting and aligning a Light Emitting Diode (LED) in a position to emit light onto the entrance surface.

20. The light guide of claim 18, wherein the light guide is molded from one of polystyrene, polycarbonate, acrylic, cyclic olefin copolymer, SAN styrene blend and NAS styrene blend.

21. The light guide of claim 18, wherein the entrance surface comprises a collecting lens.

22. The light guide of claim 17, wherein:

the first channel comprises a rear face which internally reflects directed light so as cause same to emanate from the first exit face, the second channel comprises a rear face which internally reflects directed light so as cause same to emanate from the second exit face, and the first channel extends further than the second channel.

23. The light guide of claim 17, wherein:

the first channel comprises a rear face which internally reflects directed light so as cause same to emanate from the first exit face, the second channel comprises a rear face which internally reflects directed light so as cause same to emanate from the second exit face, and the first and second exit faces lie in substantially parallel planes.

24. The light guide of claim 23, wherein the first and second exit faces are stepped relative to one another.

25. The light guide of claim 17, wherein:

the first channel comprises a rear face which internally reflects directed light so as cause same to emanate from the first exit face, and the second channel comprises a rear face which internally reflects directed light so as cause same to emanate from the second exit face, and light emanates from the first exit face at substantially a first angle to an illuminated surface and from the second exit face at substantially a second angle to the illuminated surface.

26. The light guide of claim 25, wherein the first angle is between 10° and 40° from the illuminated surface and the second angle is between 5° and 30° from the illuminated surface.

27. The light guide of claim 25, wherein the first angle is between 5° and 40° and the second angle is also between 5° and 40°, with the second angle being shallower than the first angle.

28. The light guide of claim 25, wherein the first angle is approximately 20° from the illuminated surface and the second angle is approximately 10° from the illuminated surface.

29. The light guide of claim 17, wherein between 50%–90% of light emanating from the light guide emanates from one channel and between 10%–40% of light emanating from the light guide emanates from the other channel.

30. The light guide of claim 17, wherein approximately 80% of light emanating from the light guide emanates from one channel and approximately 20% of light emanating from the light guide emanates from the other channel.

31. The light guide of claim 17, wherein:

the first channel comprises a rear face which internally reflects directed light so as cause same to emanate from the first exit face, the second channel comprises a rear face which internally reflects directed light so as cause same to emanate from the second exit face, and first exit face is not planar.

32. The light guide of claim 31, wherein the first exit face comprises multiple facets.

33. The light guide of claim 31, wherein at least a portion of the first exit face is formed as a curvilinear concave or convex refractive surface.

34. The light guide of claim 33, wherein the first exit face comprises multiple facets and a curvilinear concave portion.

* * * * *

UNITED STATES PATENT AND TRADEMARK OFFICE

CERTIFICATE OF CORRECTION

PATENT NO. : 7,009,598 B1
APPLICATION NO. : 10/382867
DATED : March 7, 2006
INVENTOR(S) : David D. Bohn It is certified that error appears in the above-identified patent and that said Letters Patent is hereby corrected as shown below:

In column 4, line 6, delete "T1_" and insert -- T1-_ --, therefor.

In column 10, line 39, in Claim 25, after "face," delete "and".

In column 11, line 8, in Claim 31, insert -- the -- before "first".

Signed and Sealed this

Thirtieth Day of March, 2010

David J. Kappos
*Director of the United States Patent and Trademark Office*